(12) United States Patent
Chiba et al.

(10) Patent No.: US 9,307,240 B2
(45) Date of Patent: Apr. 5, 2016

(54) FADE TYPE DETERMINATION DEVICE

(75) Inventors: Shintaro Chiba, Kanagawa (JP); Yutaka Yano, Tokyo (JP); Katsuyuki Ozaki, Tokyo (JP); Toshiyuki Hayashi, Kanagawa (JP)

(73) Assignee: NTT ELECTRONICS CORPORATION, Yokohama (JP)

( * ) Notice: Subject to any disclaimer, the term of this patent is extended or adjusted under 35 U.S.C. 154(b) by 218 days.

(21) Appl. No.: 14/118,846

(22) PCT Filed: Jun. 5, 2012

(86) PCT No.: PCT/JP2012/064452
§ 371 (c)(1),
(2), (4) Date: Nov. 19, 2013

(87) PCT Pub. No.: WO2013/031325
PCT Pub. Date: Mar. 7, 2013

(65) Prior Publication Data
US 2014/0198853 A1  Jul. 17, 2014

(30) Foreign Application Priority Data
Aug. 29, 2011  (JP) .................. 2011-186258

(51) Int. Cl.
*H04N 19/583*  (2014.01)
*H04N 19/12*   (2014.01)
(Continued)

(52) U.S. Cl.
CPC ......... *H04N 19/00709* (2013.01); *H04N 19/12* (2014.11); *H04N 19/142* (2014.11); *H04N 19/179* (2014.11)

(58) Field of Classification Search
CPC ............................................. H04N 19/00709

USPC ..................................................... 375/240.16
See application file for complete search history.

(56) References Cited

U.S. PATENT DOCUMENTS

| 6,493,042 B1 | 12/2002 | Bozdagi et al. |
| 6,542,544 B1 | 4/2003 | Takahashi |

(Continued)

FOREIGN PATENT DOCUMENTS

| CN | 101543075 A | 9/2009 |
| CN | 101855911 A | 10/2010 |

(Continued)

OTHER PUBLICATIONS

Campisi et al., "Automatic Dissolve and Fade Detection for Video Sequences," International Conference on Digital Signal Processing, 2002, vol. 2, pp. 567-570.

(Continued)

*Primary Examiner* — Christopher S Kelley
*Assistant Examiner* — Jonathan Messmore
(74) *Attorney, Agent, or Firm* — Arent Fox LLP (57) ABSTRACT

A fade state determination unit (5) determines that the target picture is in a fade state when a feature value A is equal to or larger than a threshold value TH_A. If the target picture has been determined to be in the fade state, a fade-in determination unit (6) determines that the target picture is of a fade-in type when a feature value B is equal to or larger than a threshold value TH_B1 and a feature value C is less than a threshold value TH_C. If the target picture has been determined to be in the fade state, a fade-out determination unit (7) determines that the target picture is of a fade-out type when the feature value B is less than a threshold value TH_B2 that is smaller than the threshold value TH_B1. A cross-fade determination unit (8) determines that the target picture is of a cross-fade type when the target picture has been determined to be in the fade state and be not of the fade-in type nor of the fade-out type.

4 Claims, 5 Drawing Sheets

(51) Int. Cl.
*H04N 19/142* (2014.01)
*H04N 19/179* (2014.01)

(56) References Cited

U.S. PATENT DOCUMENTS

| | | |
|---|---|---|
| 2001/0021267 A1 | 9/2001 | Jun et al. |
| 2009/0086814 A1 | 4/2009 | Leontaris et al. |
| 2010/0202749 A1 | 8/2010 | Ejiri |
| 2010/0302453 A1 | 12/2010 | Paschalakis et al. |

FOREIGN PATENT DOCUMENTS

| | | |
|---|---|---|
| EP | 1 039 757 A2 | 9/2000 |
| EP | 1 914 994 A1 | 4/2008 |
| EP | 2 193 663 A2 | 6/2010 |
| JP | 2000-059683 A | 2/2000 |
| JP | 2000-299816 A | 10/2000 |
| JP | 2001-285712 A | 10/2001 |
| JP | 3656036 B2 | 6/2005 |
| JP | 3724956 B2 | 12/2005 |
| JP | 2010-507155 A | 3/2010 |
| JP | 2010-183383 A | 8/2010 |
| JP | 2011-507314 A | 3/2011 |
| WO | WO 2008/046748 A1 | 4/2008 |
| WO | WO 2009/045682 A2 | 4/2009 |

OTHER PUBLICATIONS

Fernando et al., "Automatic Detection of Fade-in and Fade-out in Video Sequences," Proceedings of the 1999 IEEE International Symposium on Circuits and Systems, 1999, vol. 4, pp. 255-258.

Fernando et al., "Fade and Dissolve Detection in Uncompressed and Compressed Video Sequences," Proceedings of International Conference on Image Processing, 1999, vol. 3, pp. 299-303.

International Search Report & Written Opinion issued in PCT/JP2012/064452, dated Aug. 14, 2012, 10 pages.

FADE TYPE DETERMINATION DEVICE

CROSS-REFERENCE TO RELATED APPLICATIONS

This application is a National Stage entry of International Patent Application No. PCT/JP2012/064452, filed Jun. 5, 2012, which claims priority to Japanese Patent Application No. 2011-186258, filed Aug. 29, 2011. The disclosures of the prior applications are hereby incorporated in their entirety by reference.

TECHNICAL FIELD

The present invention relates to a fade type determination device that determines a type of fade in moving pictures before being coded.

BACKGROUND ART

A fade in moving pictures refers to a phenomenon of gradual transition from one image to another image while these images are being overlapped during the transition. The fade includes a fade-in which represents a transition from a monochromatic static image to a moving image, a fade-out which represents a transition from a moving image to a monochromatic static image, and a cross-fade (also referred to as a dissolve or an overlap) which represents a transition from one moving image to another moving image.

CITATION LIST

Patent Literature

[Patent Literature 1]
Japanese Patent No. 3724956
[Patent Literature 2]
Japanese Patent No. 3656036
[Patent Literature 3]
Japanese Patent Laid-Open No. 2010-183383

SUMMARY OF INVENTION

Technical Problem

If the moving pictures including fade are coded as they are, accuracy in motion prediction is degraded, which leads to deterioration in quality of coded pictures. Accordingly, it is preferable to determine a type of fade before the moving pictures is coded and to transmit the determined fade type to a coding processing unit. With the fade type being determined, an effective coding method can be selected depending on the fade type, so that the quality of coded pictures can be enhanced. In order to ensure high real time performance of the entire coding processing, the determination is expected to be made as fast as possible.

There has been proposed a method for predicting a uniform change in luminance or chrominance of moving pictures. This method can predict a fade-in and a fade-out, but cannot predict a cross-fade since a change in luminance or chrominance in cross-fade transition is not uniform.

There has been proposed a method for predicting a fade by comparing luminance or chrominance in serially adjacent two pictures in moving pictures (see, for example, Patent Literature 1). However, this method cannot distinguish types of fade.

There has been proposed a method for determining a type of fade by coding moving pictures in advance (see, for example, Patent Literature 2). However, this method is adapted to determine a fade type after pictures are coded.

A method has been proposed in which a cross-fade section is determined when a content digest is generated (see, for example, Patent Literature 3). However, this method is adapted to target accumulated data and therefore real time performance cannot be expected.

The present invention has been made to solve the above-described problems, and an object thereof is to provide a fade type determination device that determines a type of fade in moving pictures before being coded at high speed.

Means for Solving the Problems

A fade type determination device according to the present invention which is provided in a pre-stage of a coding processing unit coding moving pictures, determines a type of fade of a target picture included in the moving pictures before being coded, and notifies the determined fade type to the coding processing unit, includes: a fade state determination unit determining that the target picture is in a fade state when a first feature value, which represents a time change in luminance or chrominance between the target picture and its previous picture, is equal to or larger than a first threshold value, and determining that the target picture is not in the fade state when the first feature value is less than the first threshold value; a fade-in determination unit, if the target picture has been determined to be in the fade state, determining that the target picture is of a fade-in type when a second feature value, which represents a time change in complexity between the target picture and its previous picture, is equal to or larger than a second threshold value and a third feature value, which represents dissimilarity between a picture that is one picture prior to the target picture and its previous picture, is less than a third threshold value, and determining that the target picture is not of the fade-in type when the second feature value is less than the second threshold value or the third feature value is equal to or larger than the third threshold value; a fade-out determination unit, if the target picture has been determined to be in the fade state, determining that the target picture is of a fade-out type when the second feature value is less than a fourth threshold value that is smaller than the second threshold value, and determining that the target picture is not of the fade-out type when the second feature value is equal to or larger than the fourth threshold value; and a cross-fade determination unit determining that the target picture is of a cross-fade type when the target picture has been determined to be in the fade state and be not of the fade-in type nor of the fade-out type.

Advantageous Effects of Invention

The present invention makes it possible to determine a type of fade in moving pictures before being coded at high speed.

DESCRIPTION OF EMBODIMENT

Figure 1:
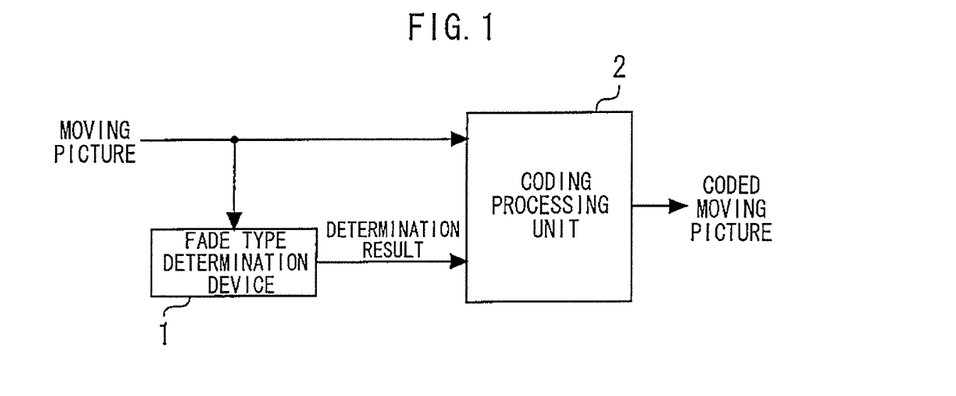
FIG. 1 is a view showing a coding device according to an embodiment of the present invention.

FIG. 1 is a view showing a coding device according to an embodiment of the present invention. A fade type determination device 1 is provided in a pre-stage of a coding processing unit 2. The fade type determination device 1 determines a type of fade of a target picture included in moving pictures before being coded, and notifies the determined fade type to the coding processing unit 2. The coding processing unit 2 selects an effective coding method in accordance with the type of fade, and codes the moving pictures.

Figure 2:
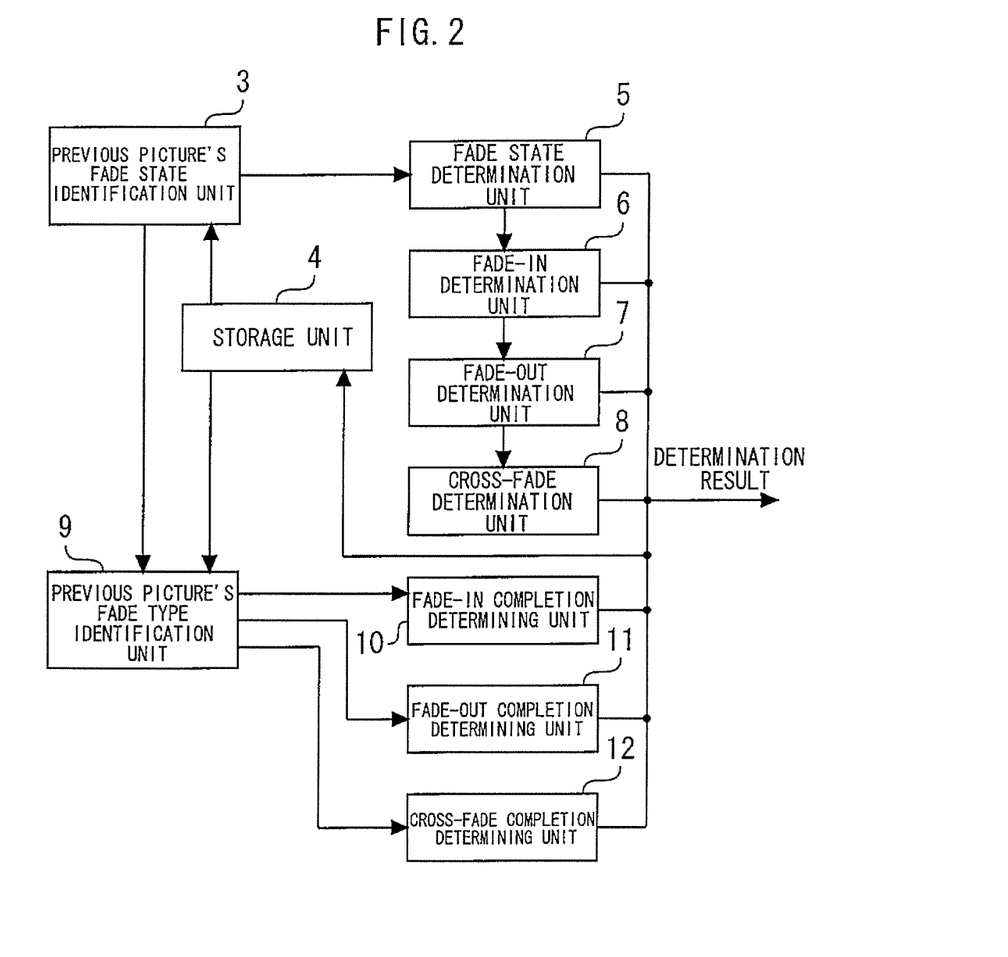
FIG. 2 is a view showing the fade type determination device 1 according to an embodiment of the present invention.
Figure 3:
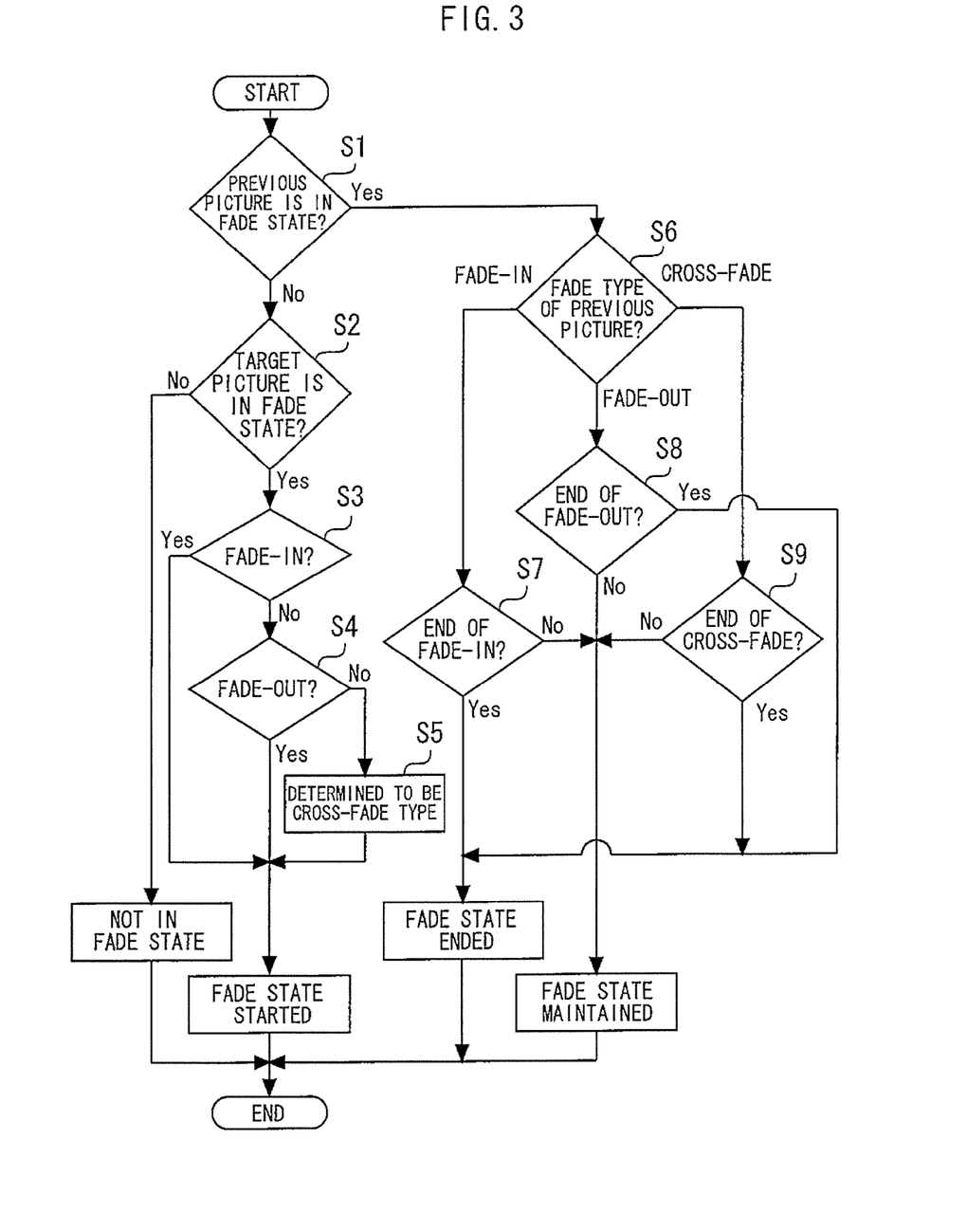
FIG. 3 is a flow chart showing a method for determining a fade type according to an embodiment of the present invention.

FIG. 2 is a view showing the fade type determination device 1 according to an embodiment of the present invention. FIG. 3 is a flow chart showing a method for determining a fade type according to an embodiment of the present invention. With reference to FIGS. 2 and 3, a description is given of a method for determining a fade type with the fade type determination device 1.

First, a previous picture's fade state identification unit 3 accesses a storage unit 4 to confirm whether or not a previous picture which is one picture prior to a target picture is in a fade state (step S1). The storage unit 4 stores whether or not the previous picture is in a fade state and the fade type of the previous picture. If the previous picture is not in the fade state, the procedure shifts to steps S2 to S5 where start of fade of the target picture is determined, whereas if the previous picture is in the fade state, the procedure shifts to steps S6 to S9 where the fade completion of the target picture is determined.

If the previous picture is not in the fade state, a fade state determination unit 5 performs fade state determination (step S2). Specifically, when a feature value A of a target picture is equal to or larger than a specified threshold value TH_A, the fade state determination unit 5 determines that the target picture is in the fade state and shifts to fade-in determination. On the contrary, when the feature value A is less than the threshold value TH_A, the fade state determination unit 5 determines that the target picture is not in the fade state and terminates determination of the target picture.

Herein, the feature value A represents a time change in luminance or chrominance between an entire target picture and its entire previous picture (a picture of near past in time series). Specifically, the feature value A is an absolute difference in accumulated pixel values between the target picture and its previous picture. The accumulated pixel value is a value obtained by adding a luminance or chrominance value of one pixel for one picture. Note that a time change in luminance or chrominance variance can also be used as the feature value A.

Next, if the target picture has been determined to be in the fade state, a fade-in determination unit 6 performs fade-in determination (step S3). Specifically, when a feature value B of the target picture is equal to or larger than a specified threshold value TH_B1 and a feature value C of a picture that is one picture prior to the target picture is less than a specified threshold value TH_C, the fade-in determination unit 6 determines that the target picture is of a fade-in type, and terminates determination of the target picture. On the contrary, when the feature value B is less than the threshold value TH_B1 or the feature value C is equal to or larger than the threshold value TH_C, the fade-in determination unit 6 determines that the target picture is not of the fade-in type and shifts to fade-out determination.

Herein, the feature value B represents a time change in complexity between a target picture and its previous picture. Specifically, the feature value B is a difference in sum of absolute differences between adjacent pixels between the target picture and its previous picture. The sum of absolute differences between adjacent pixels is a value obtained by adding an absolute difference in luminance or chrominance value between pixels, which are spatially adjacent within one picture, for one picture.

Further, the feature value C represents dissimilarity between a picture that is one picture prior to the target picture and its previous picture. Specifically, the feature value C is a value obtained by dividing the picture that is one picture prior to the target picture and its previous picture into blocks of an arbitrary size, calculating a sum of absolute differences in luminance or chrominance values between the picture that is one picture prior to the target picture and its previous picture in every block, searching for and associating with each other the blocks that have a minimum sum of absolute differences in luminance or chrominance values, and adding the sum of absolute differences in luminance or chrominance values between these associated blocks for one picture.

Note that the feature value C is generally called a prediction error sum of absolute differences or a motion compensation sum of absolute differences (MCSAD), which is a value obtained by performing motion compensation between a certain picture and a picture adjacent to the certain picture in time series (past or future), and adding a sum of absolute differences in luminance or chrominance values between associated blocks for one picture. The motion compensation is processing for searching for a part where a certain picture and a picture adjacent thereto in time series are most similar to each other. Specifically, the motion compensation is the processing in which a certain picture is divided into blocks of an arbitrary size, a sum of absolute differences in luminance or chrominance values from the picture adjacent to the certain picture in time series is calculated in every block, and (most similar) blocks that have a minimum sum of absolute differences in luminance or chrominance values is searched for and associated with each other.

Next, if it has been determined that the target picture is in the fade state and is not of the fade-in type, a fade-out determination unit 7 performs fade-out determination (step S4). Specifically, when the feature value B is less than a specified threshold value TH_B2 that is smaller than a specified threshold value TH_B1, the fade-out determination unit 7 determines that the target picture is of a fade-out type, and terminates determination of the target picture. On the contrary, when the feature value B is equal to or larger than the threshold value TH_B2, the fade-out determination unit 7 determines that the target picture is not of the fade-out type, and shifts to cross-fade determination.

Next, when it has been determined that the target picture is in the fade state and is not of the fade-in type nor of the fade-out type, a cross-fade determination unit 8 determines that the target picture is of a cross-fade type, and terminates determination of the target picture (step S5). Note that some pictures may not fall within the above-described cross-fade definition in a precise sense, though all the pictures that fulfill the above conditions are determined to be of the cross-fade type.

When a previous picture is in the fade state, a previous picture's fade type identification unit 9 accesses the storage unit 4, and identifies the fade type of the previous picture (step S6). When the previous picture is of the fade-in type, the procedure shifts to determination of fade-in completion, when the previous picture is of the fade-out type, the procedure shifts to determination of fade-out completion, and when the previous picture is of the cross-fade type, the procedure shifts to determination of cross-fade completion.

If the previous picture is of the fade-in type, a fade-in completion determining unit 10 performs determination of fade-in completion (step S7). Specifically, when the feature value A is less than the threshold value TH_A or the feature value B is less than the threshold value TH_B1, the fade-in completion determining unit 10 determines that the fade state and fade-in have been ended. On the contrary, when the feature value A is equal to or larger than the threshold value TH_A and the feature value B is equal to or larger than the threshold value TH_B1, the fade-in completion determining unit 10 determines that the fade state and fade-in are continuing.

If the previous picture is of the fade-out type, a fade-out completion determining unit 11 performs determination of fade-out completion (step S8). Specifically, when the feature value A is less than the threshold value TH_A or the feature value B is equal to or larger than the threshold value TH_B2, the fade-out completion determining unit 11 determines that the fade state and fade-out have been completed. On the contrary, when the feature value A is equal to or larger than the threshold value TH_A and the feature value B is less than the threshold value TH_B2, the fade-out completion determining unit 11 determines that the fade state and fade-out are continuing.

If the previous picture is of the cross-fade type, a cross-fade completion determining unit 12 performs determination of cross-fade completion (step S9). Specifically, when the feature value A is less than the threshold value TH_A, the cross-fade completion determining unit 12 determines that the fade state and cross-fade have been ended. On the contrary, when the feature value A is equal to or larger than the threshold value TH_A, the cross-fade completion determining unit 12 determines that the fade state and cross-fade are continuing.

Determination results by these fade state determination unit 5, fade-in determination unit 6, fade-out determination unit 7, cross-fade determination unit 8, fade-in completion determination unit 10, fade-out completion determination unit 11, or cross-fade completion determination unit 12 are notified to the coding processing unit 2 while being stored in the storage unit 4.

Figure 4:
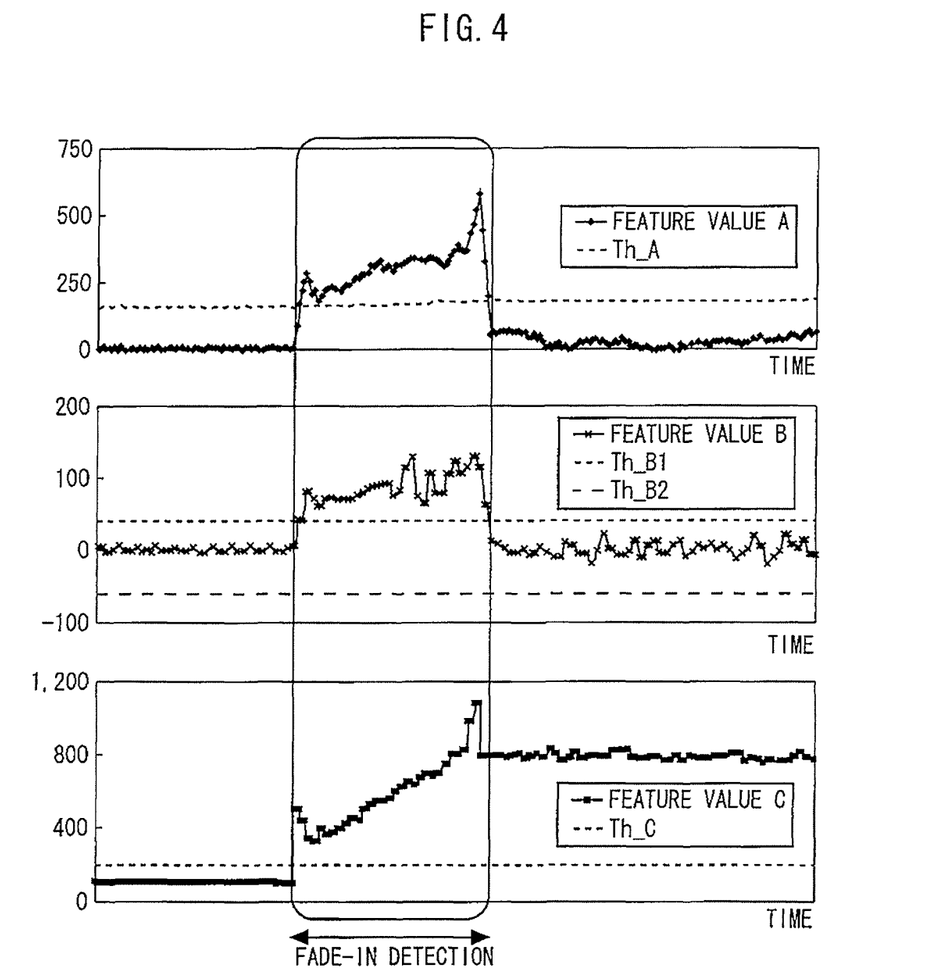
FIGS. 4 to 6 are views showing determination results by the determination method according to an embodiment of the present invention.
Figure 5:
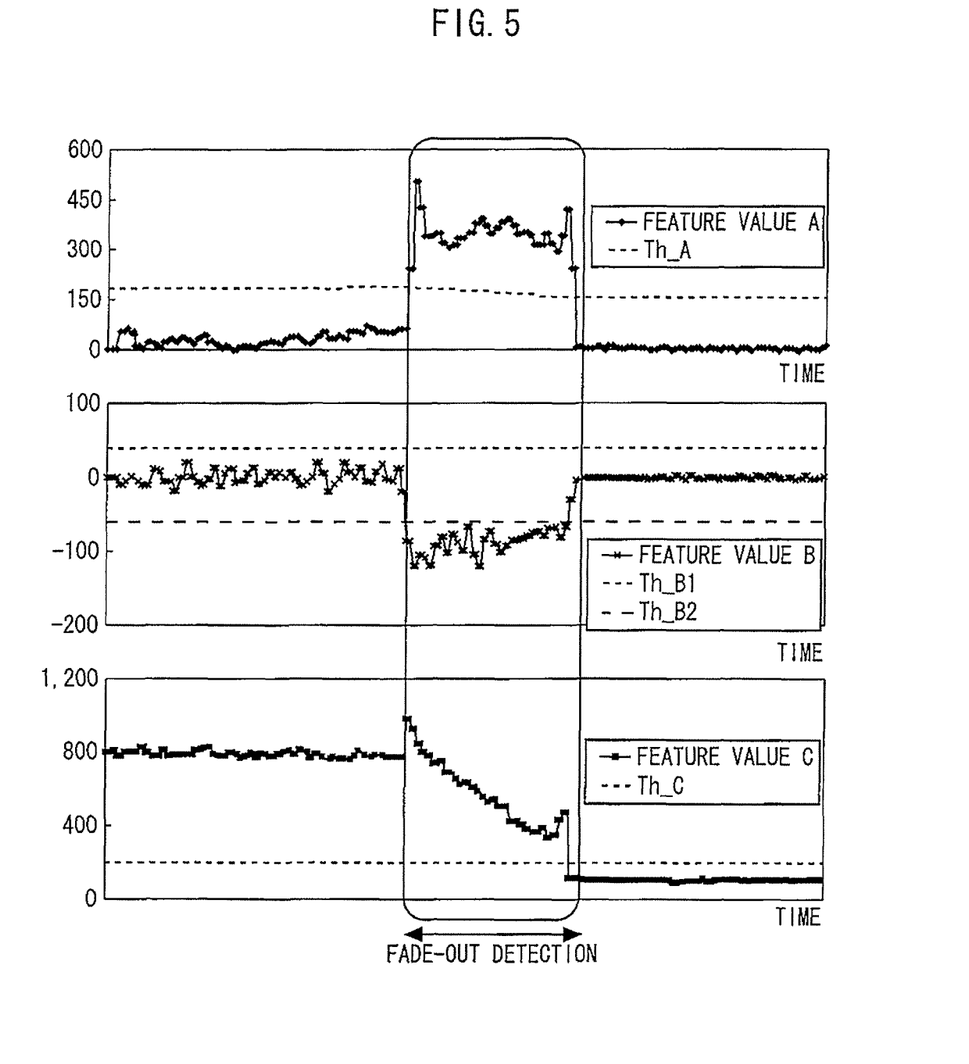
Figure 6:
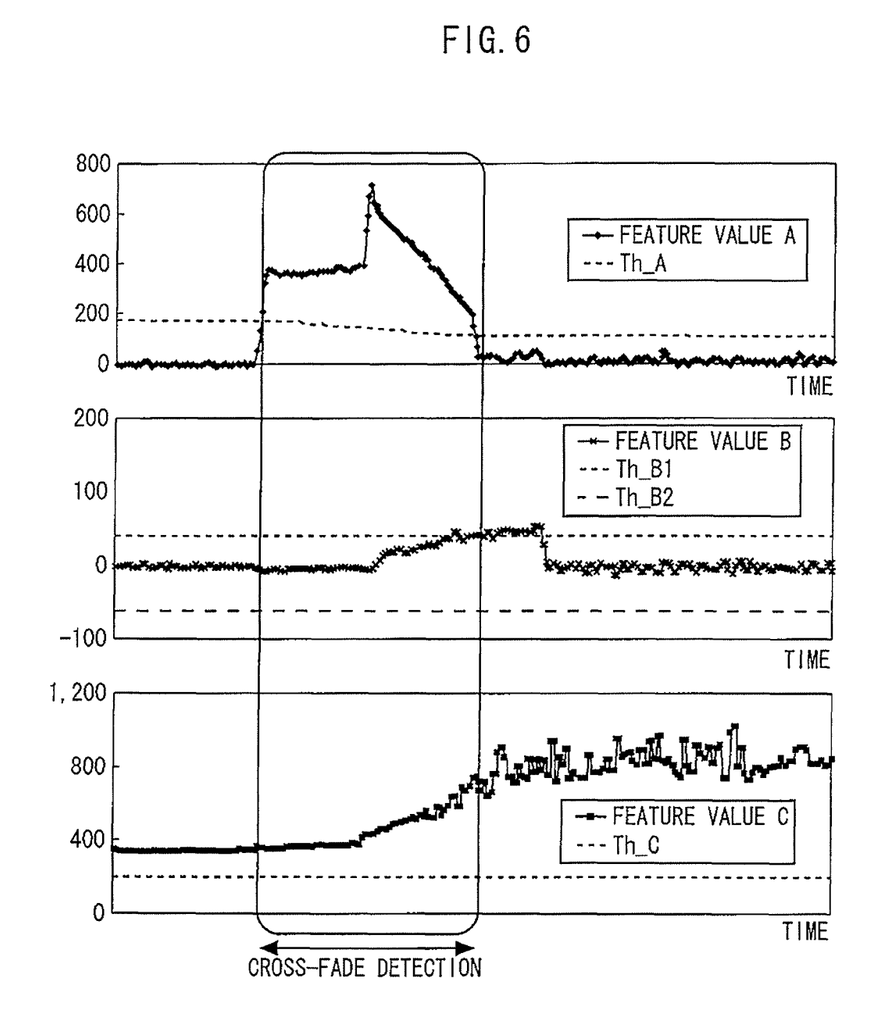

FIGS. 4 to 6 are views showing determination results by the determination method according to an embodiment of the present invention. A horizontal axis represents a time-axis and a vertical axis represents the feature values A, B, and C. The threshold value TH_A is defined to be 0.5% of a sum of luminance values of a target picture, the threshold value TH_B1 is defined to be 40, the threshold value TH_B2 is defined to be −60, and the threshold value TH_C is defined to be 200. Each view indicates that the fade-in, fade-out, and cross-fade type can successfully be determined in accordance with a change in feature values A, B, and C.

As described in the foregoing, the fade type determination device 1 according to the present embodiment determines a type of a fade in a target picture included in moving pictures before being coded, and notifies the determined fade type to the coding processing unit 2. With the fade type being determined, the coding processing unit 2 can select an effective coding method in accordance with the type of fade, so that the quality of coded pictures can be enhanced.

Further in the present embodiment, the feature value A is used to determine whether or not a target picture is in the fade state. Here, since the luminance and chrominance of the entire picture considerably change over time during fade, the feature value A is used for determination of the fade state.

Then, the feature value B and the feature value C are used to determine the type of a fade (fade-in, fade-out, cross-fade) in the target picture.

In this case, since fade-in is a transition from a monochromatic static image to a moving image, the complexity relatively changes from low to high in the fade-in transition. On the contrary, an opposite change occurs in the fade-out transition. Since cross-fade is a transition from one moving image to another moving image, a time change in complexity is smaller than that in the fade-in and fade-out transitions. In order to capture a difference in time change in complexity between every fade type, the feature value B is used.

In order to assist fade-in determination with the feature value B, the feature value C is used. Immediately before occurrence of fade-in transition, similarity between pictures is high. Accordingly, by using as assistance the feature value C that represents dissimilarity between a target picture and its previous picture, fade-in determination accuracy is enhanced. Note that in the fade-out determination, it is necessary to use the feature value C that represents dissimilarity between a target picture and a (future) picture immediately after the fade-out completion, which leads to processing delay. Therefore, it is not effective to use the feature value C for fade-out determination, and so the feature value C is used only for fade-in determination.

Further, since the feature values A, B, and C that represent a change between the target picture and its previous picture are used, high speed performance can be expected. Therefore, according to the present embodiment, the type of fade included in moving pictures before being coded can be determined at high speed.

Moreover, the fade-in determination unit 6 uses not only the feature value B but also the feature value C, whereas the fade-out determination unit 7 uses only the feature value B. Accordingly, the fade-in determination unit 6 is higher in determination accuracy than the fade-out determination unit 7. For this reason, in the present embodiment, when the fade-in determination unit 6 has determined that a target picture is not of the fade-in type, the fade-out determination unit 7 performs determination. This enhances a determination system.

Further, by identifying the fade state and the fade type of the previous picture and performing determination in response to the identification result, a picture which is in the fade state can be determined from a series of pictures included in moving pictures, and a start picture and an end picture of the fade can be determined while the type of the fade can also be determined.

Note that for the feature values A, B, and C, a picture for use in comparison with a target picture is taken from an arbitrary point in time series. In the present embodiment, a picture that is two pictures prior to a target picture in time series is used for the feature values A and B, while a picture that is one picture prior to the target picture in time series is used for the feature value C from a viewpoint of putting a high priority on high-speed fade determination processing performance.

DESCRIPTION OF SYMBOLS

1 FADE TYPE DETERMINATION DEVICE
2 CODING PROCESSING UNIT
3 PREVIOUS PICTURE'S FADE STATE IDENTIFICATION UNIT
4 STORAGE UNIT
5 FADE STATE DETERMINATION UNIT
6 FADE-IN DETERMINATION UNIT
7 FADE-OUT DETERMINATION UNIT

8 CROSS-FADE DETERMINATION UNIT
9 PREVIOUS PICTURES FADE TYPE IDENTIFICATION UNIT
10 FADE-IN COMPLETION DETERMINING UNIT
11 FADE-OUT COMPLETION DETERMINING UNIT
12 CROSS-FADE COMPLETION DETERMINING UNIT

The invention claimed is:

1. A fade type determination device which is provided in a pre-stage of a coding processing unit coding moving pictures, determines a type of fade of a target picture included in the moving pictures before being coded, and notifies the determined fade type to the coding processing unit, comprising:
a fade state determination unit determining that the target picture is in a fade state when a first feature value, which represents a time change in luminance or chrominance between the target picture and its previous picture, is equal to or larger than a first threshold value, and determining that the target picture is not in the fade state when the first feature value is less than the first threshold value;
a fade-in determination unit, if the target picture has been determined to be in the fade state, determining that the target picture is of a fade-in type when a second feature value, which represents a time change in complexity between the target picture and its previous picture, is equal to or larger than a second threshold value and a third feature value, which represents dissimilarity between a picture that is one picture prior to the target picture and its previous picture, is less than a third threshold value, and determining that the target picture is not of the fade-in type when the second feature value is less than the second threshold value or the third feature value is equal to or larger than the third threshold value;
a fade-out determination unit, if the target picture has been determined to be in the fade state, determining that the target picture is of a fade-out type when the second feature value is less than a fourth threshold value that is smaller than the second threshold value, and determining that the target picture is not of the fade-out type when the second feature value is equal to or larger than the fourth threshold value; and
a cross-fade determination unit determining that the target picture is of a cross-fade type when the target picture has been determined to be in the fade state and be not of the fade-in type nor of the fade-out type.

2. The fade type determination device according to claim 1, wherein the first feature value is an absolute difference in accumulated pixel values between the target picture and its previous picture,
the accumulated pixel value is a value obtained by adding a luminance or chrominance value of one pixel for one picture,
the second feature value is a difference in sum of absolute differences between adjacent pixels between the target picture and its previous picture,
the sum of absolute differences between adjacent pixels is a value obtained by adding an absolute difference in luminance or chrominance value between pixels, which are spatially adjacent within one picture, for one picture,
the third feature value is a value obtained by dividing the picture that is one picture prior to the target picture and its previous picture into blocks of an arbitrary size, calculating a sum of absolute differences in luminance or chrominance values between the picture that is one picture prior to the target picture and its previous picture in every block, searching for and associating with each other the blocks that have a minimum sum of absolute differences in luminance or chrominance values, and adding the sum of absolute differences in luminance or chrominance values between these associated blocks for one picture.

3. The fade type determination device according to claim 1, wherein the fade-out determination unit performs determination when the fade-in determination unit has determined that the target picture is not of the fade-in type.

4. The fade type determination device according to claim 1, further comprising:
a storage unit storing whether or not a previous picture, which is one picture prior to the target picture, is in the fade state and the fade type of the previous picture;
a previous picture's fade state identification unit confirming whether or not the previous picture is in the fade state;
a previous picture's fade type identification unit identifying the fade type of the previous picture when the previous picture is in the fade state;
a fade-in completion determining unit, if the previous picture is of the fade-in type, determining that the fade state and fade-in have been ended when the first feature value is less than the first threshold value or the second feature value is less than the second threshold value, and determining that the fade state and fade-in are continuing when the first feature value is equal to or larger than the first threshold value and the second feature value is equal to or larger than the second threshold value;
a fade-out completion determining unit, if the previous picture is of the fade-out type, determining that the fade state and fade-out have been completed when the first feature value is less than the first threshold value or the second feature value is equal to or larger than the fourth threshold value, and determining that the fade state and fade-out are continuing when the first feature value is equal to or larger than the first threshold value and the second feature value is less than the fourth threshold value; and
a cross-fade completion determining unit, if the previous picture is of the cross-fade type, determining that the fade state and cross-fade have been ended when the first feature value is less than the first threshold value, and determining that the fade state and cross-fade are continuing when the first feature value is equal to or larger than the first threshold value,
wherein the fade state determination unit performs fade state determination if the previous picture is not in the fade state.

* * * * *